(12) United States Patent
Grimm et al.

(10) Patent No.: US 7,187,090 B2
(45) Date of Patent: Mar. 6, 2007

(54) MOBILE HIGH VOLTAGE NETWORK

(75) Inventors: Magnus Grimm, Wald (DE); Helmut Koeing, Stoetten (DE); Elmar Kemmler, Kaufbeuren (DE); Michael Saller, Mossbach (DE)

(73) Assignee: AGCO GmbH & Co., Marktoberdorf (DE)

( * ) Notice: Subject to any disclaimer, the term of this patent is extended or adjusted under 35 U.S.C. 154(b) by 337 days.

(21) Appl. No.: 10/266,166

(22) Filed: Oct. 7, 2002

(65) Prior Publication Data

US 2003/0107851 A1 Jun. 12, 2003

(30) Foreign Application Priority Data

Oct. 26, 2001 (GB) ................... 0125698.1

(51) Int. Cl.
*H01H 47/00* (2006.01)
(52) U.S. Cl. ........................................ 307/125; 361/62
(58) Field of Classification Search ............... 307/82, 307/151, 125; 361/62
See application file for complete search history.

(56) References Cited

U.S. PATENT DOCUMENTS

| | | | | |
|---|---|---|---|---|
| 3,801,757 A | * | 4/1974 | Carissimi et al. | 200/50.28 |
| 5,477,091 A | * | 12/1995 | Fiorina et al. | 307/66 |
| 5,635,817 A | * | 6/1997 | Shiska | 320/105 |
| 5,708,551 A | | 1/1998 | Bosatelli | |
| 6,125,024 A | | 9/2000 | LeComte et al. | 361/104 |
| 6,490,141 B2 | * | 12/2002 | Fischer et al. | 361/66 |
| 6,775,120 B2 | * | 8/2004 | Hernandez et al. | 361/103 |
| 7,046,491 B2 | * | 5/2006 | Colette et al. | 361/23 |
| 2002/0024782 A1 | * | 2/2002 | Kim et al. | 361/42 |
| 2003/0058595 A1 | * | 3/2003 | Murabayashi et al. | 361/90 |

FOREIGN PATENT DOCUMENTS

| | | |
|---|---|---|
| DE | 4244116 | 3/1994 |
| DE | 198 38 492 | 3/2000 |
| EP | 973239 | 7/1999 |
| EP | 1094586 | 4/2001 |
| GB | 2140634 | 11/1984 |
| GB | 2199704 | 7/1988 |

* cited by examiner

Primary Examiner—Chau N. Nguyen
Assistant Examiner—Daniel Cavallari
(74) Attorney, Agent, or Firm—MacMillan, Sobanski & Todd, LLC

(57) ABSTRACT

A mobile high voltage network supplies electrical consumer units connected via a plug-in connector and can be switched on and off by means of mechanical switches, with a fuse responding in the event of a short circuit. The high voltage network carries a direct voltage and to each electrical consumer unit (8; 10) a separate diagnostic and protection monitoring system is assigned which is activated when it is switched on and/or off. Such a direct voltage and high voltage network in conjunction with the diagnostic and protection monitoring system makes it possible, before starting up any circuit of consumer units, to effect a self-diagnosis of the protection monitoring system, to ensure that all components are fully functional. Without this, self-diagnosis with proof of functionality the relevant circuit of consumer units is not switched on.

40 Claims, 3 Drawing Sheets

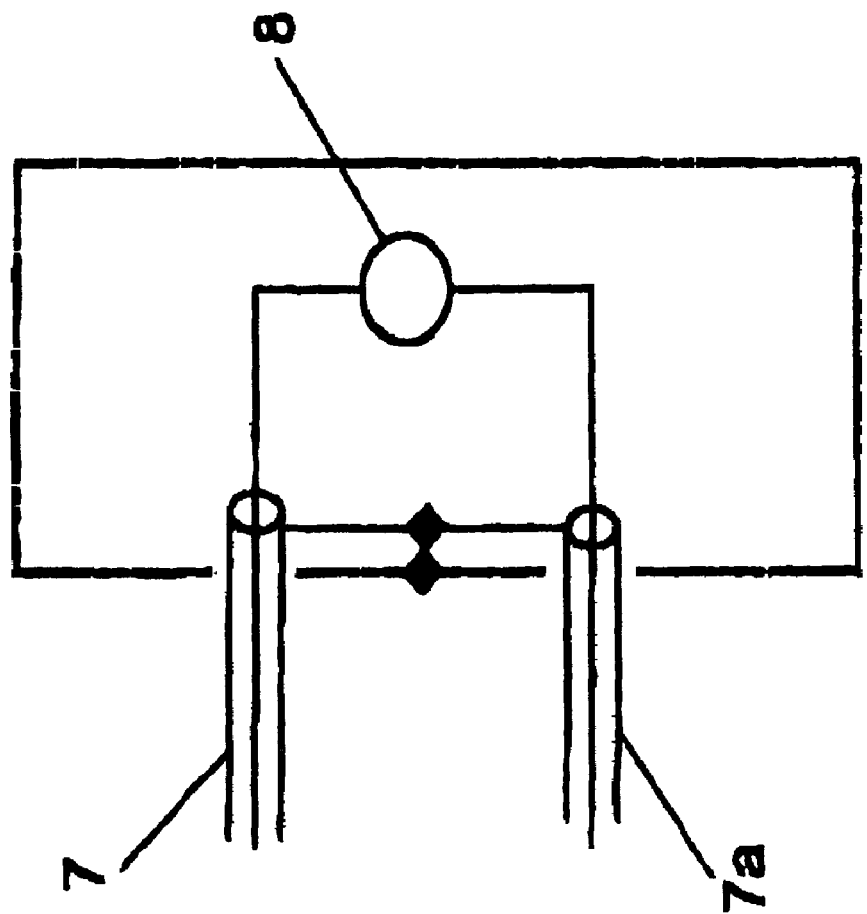

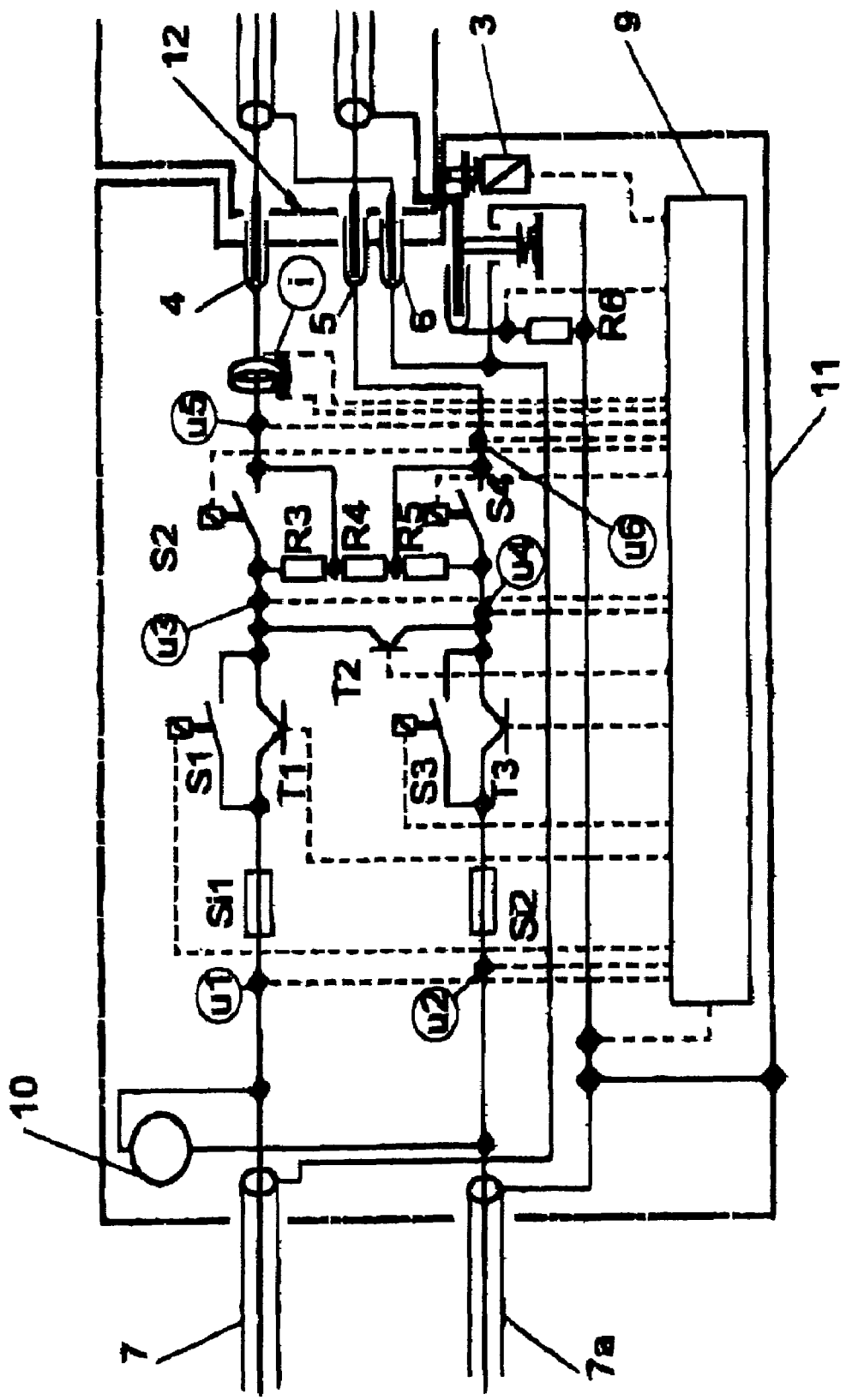
Fig: 3

MOBILE HIGH VOLTAGE NETWORK

BACKGROUND OF THE INVENTION

The invention relates to a mobile high voltage network to supply an electrical consumer unit connected by a plug-in connector and which can be actuated by means of mechanical switches, with a fuse responding in the event of a short-circuit.

So far, few applications have been known for the mobile use of electrical networks of high power transmission. Basically, the conditions and solutions which have become known from stationary high voltage networks have been taken as the basis for this. With such networks, for which only alternating voltages are customary, cable breakage and the separating of connection couplings under load on account of the zero passage of the voltage gradient cause no problems. With a view to the greatest possible flexibility, a high degree of efficiency, a low expenditure on components, as well as a reasonably priced solution, including the expenditure on power electronics, the loss through the power electronics, as well as the expenditure for the stabilization of the network frequency and the network voltage, it has thus far been uneconomic for power transmission by means of high voltage networks based on alternating or direct current.

In the mobile field, electronically controlled and monitored technical devices have become known already which are capable of self-diagnostic checking. That means that during operation, faults which occur are detected and appropriate actions are instigated.

The task of the invention lies in creating a mobile high voltage network of the type described in the introduction hereto, that is economic to operate and to monitor.

This task is solved by the fact that the mobile high voltage network carries a direct voltage, and a separate diagnostic and protection monitoring system is assigned to each electrical consumer unit or load. Such a mobile high voltage network, in conjunction with the diagnostic and protection monitoring makes it possible, before the starting up of any consumer circuit, to carry out the protective monitoring so as to ensure that all the components are fully operational. Without this self-diagnostic check with proof of the capacity to operate, the relevant consumer circuit is not connected.

The diagnostic and protective monitoring device detects insulation faults and faults of the electrical connection. The diagnostic and protective monitoring device also prevents any separation of the electrical connector when live. In the event of too high electrical current, a fuse prevents the overloading of the diagnostic and protective monitoring device and the electrical line connections and junctions.

The diagnostic and protection monitoring is, however, also used to regulate the switching off of the consumer so that the network connection can be separated. For this, the consumer is disconnected from the high voltage network and the remaining network circuits are monitored to see if they are live. In particular, consumers with stored energy—electrical accumulators or also machines, which on stopping still feed current into the consumer—are transferred via a short-circuit connection into the safe condition with no voltage and no current. As soon as the consumer has definitely reached the condition where there is no voltage, the protection monitoring releases the plug-in connection for the separation.

This allows a separation of components carrying D.C. voltage, without the surrounding medium being ionized and without any arc occurring. The current can therefore be safely interrupted. In this way, no special protection medium, (e.g. hydrogen) is needed in the contact area and devices to blow out arcs. The operational reliability is increased many times more that with so far customary devices which use protection gas and arc blow-devices. The occurrence of an arc is excluded by the proposed solution. There is, therefore, no burning off of the contacts, nor is any device needed to extinguish arcs. Over the whole lifespan, without any additional measures the operational reliability of the diagnostic and monitoring, protection is therefore guaranteed. Through the monitoring of insulation faults, line breakage, or too great a flow of power, it is guaranteed that no danger arises when using electronically operated machines through the high voltage network.

The parallel circuit of a mechanical switch and a power switch makes it possible to use the advantageous properties and characteristics of these components to the base advantage. Thus, electronic power switches are in a position to by-pass relatively large potential differences with arc formation, whilst mechanical switches are very prone to this.

On the other hand, electronic power switches, unlike mechanical switches, exhibit high losses. When following the stated method of switching both when switching on and switching off the consumer, due to the effective electronic power switches, on the mechanical switch, there is a very slight voltage difference, which cannot adequately ionize the environment so as to cause no arcs. In addition, with the consumer switched on, only a slight drop in power is detected at the switches. The degree of effectiveness of the switching device is higher, and the thermal incidence, which is slight on account of the reduces loss of power, can be dissipated to the environment without additional cooling devices.

The features of the invention bring about on the mechanical switches certain preset voltage levels, which make it possible to establish the proper function of the switches. In addition, the current path takes over the dissipation of the slight leakage current of the power switches, in order to definitely exclude burning off on the contacts.

Due to the features of the invention, the plug-in connector cannot be separated when it is under electrical voltage. Therefore, any danger from the occurrence of an arc or contact with live components is excluded. Only in the state where there is no current and no voltage can the connector be disconnected.

The features of the invention make it possible for the diagnostic device to detect potential changes on the screening line, which occur in the event of damage in the insulation fitted between the line carrying current and the protection line through external effects or the interruption of the screening line. The network is then reliably switched off, so that there can be no danger from any damaged line. It is, therefore, guaranteed that the essentially higher probability of the occurrence of harmful effects on the lines in mobile use is not faced with a higher danger potential.

The features of the invention ensure the detection of insulation faults or line interruptions of lines from both the positive and negative pins.

Further advantageous details and features of the invention can be seen in the claims.

The invention is explained in greater detail hereinafter by reference to the drawings.

BRIEF DESCRIPTION OF THE DRAWINGS

FIG. 2 is a circuit diagram of a simple electrical consumer which is connected by means of a plug to the diagnostic and protection monitoring system in accordance with FIG. 1.

FIG. 3 is a circuit diagram of an electrical consumer with a further diagnostic and protection monitoring system which can be connected by means of a socket to the diagnostic and protection monitoring system in accordance with FIG. 1.

DETAILED DESCRIPTION OF THE PREFERRED EMBODIMENTS

Figure 1:
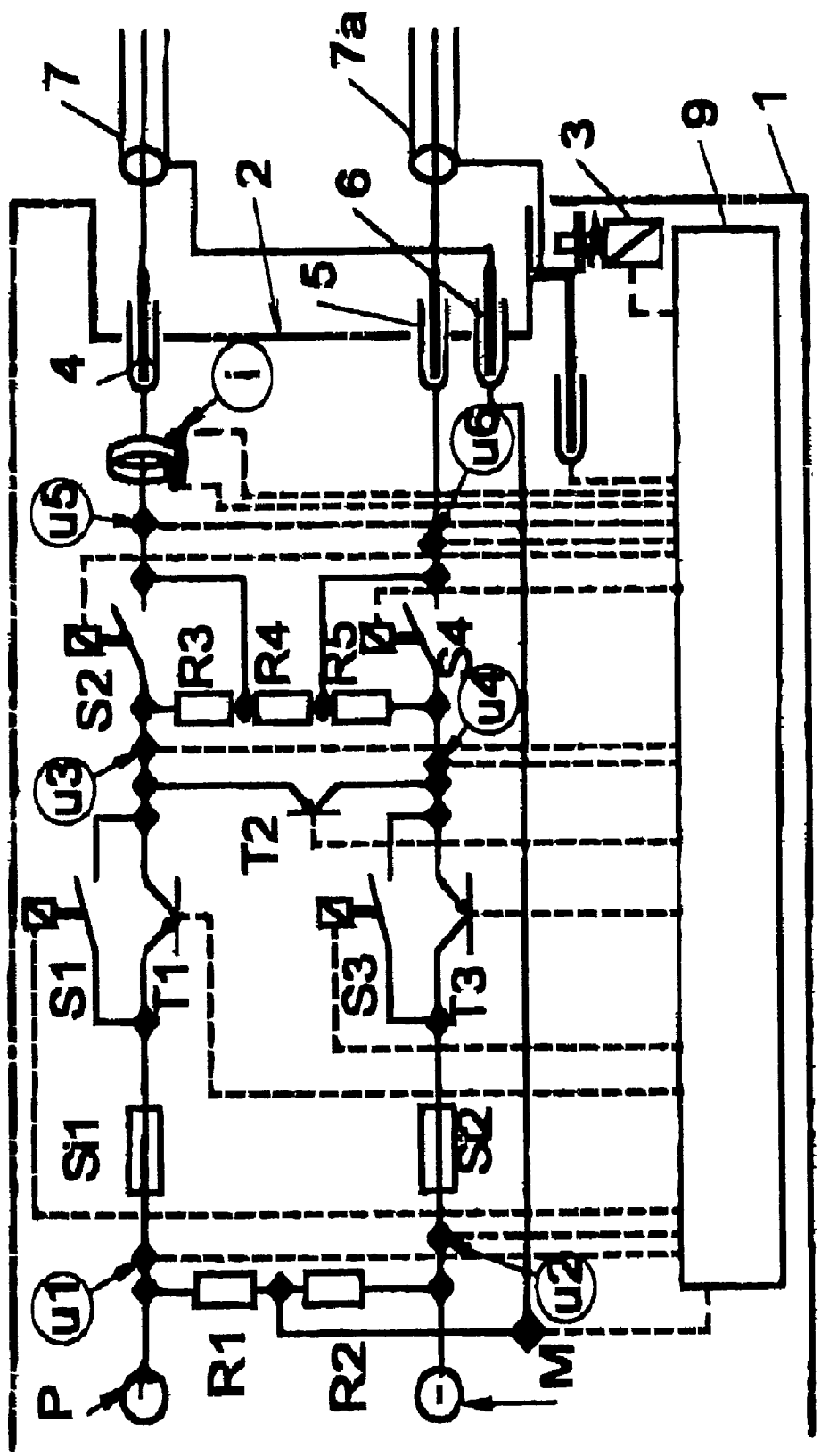
FIG. 1 is a circuit diagram of a diagnostic and protection monitoring system with socket connected to the + pin and the − pin of a D.C. voltage source.

In FIG. 1, only the positive pin P and the negative pin M of a mobile high voltage network can be fed by a suitable D.C. current generator, which is not shown. An electrical consumer 8 (see FIG. 2) is connected to these pins, with a diagnostic and protection monitoring device accommodated in an insulated casing 1. A plug-in connector 2 facilitates the connection of the electrical consumer 8 to the high voltage network. The plug-in connector 2 is secured against disconnection in situations which are not allowed by means of a mechanical lock 3.

In a positive line between the positive pin P and a first contact 4 of a socket of the connector 2, in series behind each other, there is a fuse Si1, an electronic power switch T1, a mechanical switch S2, and an ammeter device i. In a negative line between the negative pin M and a second contact 5 of the socket, in series behind each other, there is a fuse Si2, an electronic power switch T3, and a mechanical switch S4. A mechanical switch S1, S3 is connected in parallel to each of power switches T1 and T3. In the direction of the current flow behind the power switches between the positive line and the negative line, a power switch T2 is located. The network further comprises a resistor series circuit consisting of three identical high-impedance resistors R3, R4, R5 whereby the voltage between the resistors R3 and R4 is applied to the free contact of switch S2 and a voltage between R4 and R5 is applied to the free contact of switch S4.

To generate a reference potential, there is a further resistance series circuit before fuses Si1 and Si2 between the positive line and the negative line consisting of two identical high-impedance resistors R1, R2. The reference potential is defined as the average potential occurring between the resistors, which is fed via the third contact 6 of the socket into the one protection line 7 of the connected consumer 8. The other protection line 7a of the consumer 8 is connected to a fourth contact 13 of the connector, from where there is an electrical connection for a diagnostic evaluation device 9. The protection lines 7 and 7a are surrounded by an insulating layer and this again surrounds the current-carrying lines leaving contacts 4, 5.

The consumer 8 may be located alone or in series with further consumer units in a consumer unit circuit. "In series" here does not mean an electronic series circuit, where an electric current flows through every consumer unit and a part of the mains voltage is dissipated. Instead, here it means an stacked arrangement of consumer units, where each connected consumer unit makes available a voltage source for a further consumer unit, as explained below in connection with FIG. 3.

The drawing shows, in the form of latched lines, control lines for the control of switches S1, T1, S3, T3, T2, S2, S4 lines for the transmission of the measured values of the ammeter device i, as well as lines for the transmission of voltage values to the measuring points u1, u2, u3, u4, u5 and u6 of the protection monitoring system. These lines are connected to an evaluation device 9, which makes the protection monitoring capable of self-diagnosis.

FIG. 3 shows an electrical consumer 10 connected to the protection monitoring in accordance with FIG. 1 by means of a further unit 11, from which a still further electrical consumer can be supplied with electrical power via a plug-in connection 12. The further electrical consumer 11 again includes a diagnostic and protection monitoring system of the same kind as described in FIG. 1. The reference potential generated by the resistors R1, R2 of FIG. 1 is used in the further electrical consumer 11 so that in the event of a fault a high-impedance contact protection is guaranteed.

For the constant monitoring of protection line 7 by the evaluation device 9 (to check for continuous flow and passage), a reference potential is connected via the protection line 7 of a connected consumer unit 10 to the third contact 6 of the diagnostic and protection monitoring system which is in the further electrical consumer 11. This reference potential is also connected to a normally closed contact S5. The normally closed contact S5 is opened, if via the connector 12 a further consumer unit is connected, and closed, if the connector is disconnected.

In the open condition of the normally closed contact S5, that is if a further consumer unit is connected, the direct connection between protection lines 7 and 7a is interrupted. A reference potential is connected from the third contact 6 of connector 12 to the evaluation unit 9 of FIG. 3 and via resistor R6 and line 7a to the fourth contact 13 of FIG. 1 and hence to the evaluation device 9 of FIG. 1.

Method of Operation of the Diagnostic and Protection Monitoring System:

Switching on the Consumer Unit:

If the supply is guaranteed by the generator the positive and negative voltages are measured at measuring points u1, u2 against the reference potential produced by the resistors R1, R2. If the fuse Si1, Si2 are in order and switchers S1, S3 are open, then the electronic power switched T1, T2 and T3 in the disconnected condition act like resistors in series between the + pin and − pin. Between measuring points u1 and u3, u3 and u4, as well as between u4 and u2 characteristic voltages can then be measured. If these voltages to zero, then power switches T1, T2 and T3 are safely disconnected.

Switches, S2 S4 are open if between measuring points u3 and u5, as well as between u4 and u6, the voltages corresponding to the resistance series circuit from resistors R3, R4 and R5 are present.

If this condition is present, then in the first instance switches S2, S4 are closed. Now, the voltages between measuring points u3 and u5, as well as between u4 and u6, drop to zero volts. On the next opening of switches S2, S4, the voltages must rise again.

The next step is that power switch T2 is switched on. The voltage between measuring point u3 and u4 must now decrease with the voltage drop of power switch T2 in the connected condition. If this happens, then power switch T2 is in order and it is switched off again.

Power switches T1, T3 can now be switched on, and the voltages between measuring point u1 and u3, as well as between u4 and u2 must go typically from 2V to <4V in response to the voltage drop at the power switches T1 and T3. Then, power switches T1 and T3 are again switched off and the voltages rise again.

Switches S1, and S3 can now be switched on, and the voltages between measuring points u1 and u3, as well as between u4 and u2, must properly got to 0V.

Then switches S1 and S3 are switched off again, whereupon with perfect operation, the voltages rise again.

Now, switches S2 and S4 are closed, and power switch T3 is switched on. The voltage between the measuring point u4 and u2 must decrease with the known voltage drop of power switch T3. This ensures that this switch is switched on. Now, switch S3, which has the task of minimizing the loss of power switch T3, is closed.

Power switch T1 is now switched on again, and the voltage supply occurs on connector 2 and electrical consumer 8, which is connected thereto. In order to minimize the power losses on power switch T1, switch S1 is then switched on, and power switch T1 is switched off.

The described procedure of switching on may only take place if protection lines, 7, 7a for the onward passage of the reference potential do completely allow passage and no interruptions occur.

Switching off the Electrical Consumer:

The switch-off procedure begins with the opening of switches S1 and S3. Then, power switch T1 is switched off and power switch T2 is switched on. Since via the consumer, which can also work as a generator, voltage can be fed in, a short circuit is necessary via power switch T2, so that the voltage in this case does not rise too high, if there is no protection device for this in the consumer.

As soon as the ammeter device i establishes that no further current is flowing (consumer 8 no longer working as a generator), switches S2 and S4 are opened.

The switching off of switches S2, S4 is checked by measuring voltage between measuring points u3 and u5 or u4 and u6. If the switching off was unsuccessful, power switches T3 and T2 are switched off.

Faults:

Power switch T1 does not switch on:

This can be discovered when switching on by voltage measurement between measuring point u1 and u3.

Consequence: no switching on possible.

Power switch T1 does not switch off:

This can be discovered when a power switch T1 is switched on and/or off. If a defect is found, then the switch-on procedure can not be affected.

When switching off, by short-circuiting the power switch T2, the voltage at measuring points u1, u3 and u5 collapses. The short-circuit current destroys the fuse Si1 or Si2. As soon as it is no longer possible to establish any further current via ammeter device i, then complete switching off is effected. Consequence: no further switching on possible; by voltage measurement between measuring point u1 and u3, it is possible to discover any defect of the fuse or defect of power switch T1.

Power Switch T3 does not Switch on:

This can be discovered when switching on by measuring voltage between measuring points u2 and u4.

Consequence: no switching on possible.

Power switch T3 does not switch off:

When testing a switching function it is already possible to discover whether power switch T3 switches on and off. If a defect is found, then the switching-on procedure can no longer be effected.

When switching off, faulty operation can be discovered by measuring the voltage between measuring points u2 and u4. If power switch T3 does not switch off, then nonetheless connector 2 can be switched off, the network is separated safely by switches S2 and S4.

Consequence: no Switching on possible.

Power switch T2 does not switch on:

This can be discovered when switching on between measuring points u3 and u4.

Consequence: no switching on possible, when switching off the mains connection, with the consumers working as generators an intolerably high voltage may occur.

Power switch T2 does not switch off:

During the switch-on test or when switching off, this can be discovered by measuring between measuring points u3 and u4.

Consequence: no further switching on possible, since otherwise there is a short circuit. Safe switching off is possible.

Fault on switch S1: corresponding fault on power switch T1.
Fault on switch S3: corresponding fault on power switch T3.
Fault on switches S2, S4:

This is checked during the switch-on test operation, and can be discovered via voltage between measuring points u3 and u5 or u4 and u6.

Consequence: no further switching on possible; cannot be opened when switching on switches S2, S4, power switches T2 and T3 remain switched on.

Prevention of Arcs:

The on/off switching procedure is accomplished with electronic power switches T1, T3 and mechanical switches S1, S2, S3 and S4. The on/off switching procedure and the ammeter device prevent the occurrence of an arc on switches S1, S2, S3 and S4 either through reduction to very low switching voltages or very high-impedance current paths.

The occurrence of an arc in the connector is prevented by the fact that this can only be separated via a controlled locking device, if the mains voltage to the connector is switched off.

If an arc occurs through mechanical effects on the current-carrying line to consumer 8, which is protected by protection line 7, then this is detected by protection line 7 through a voltage drop or voltage rise of the reference voltage and the mains voltage is switched off.

Interruption of the Protection Line:

Protection line 7 is constantly monitored by the evaluation device 9 for full flow and passage. For this, the reference potential is connected via protection line 7 of a connected consumer 8 to the evaluation device 9 (FIG. 1). If, as shown in FIG. 3, a connected consumer 10 comprises a connector 12 and provides for the connection of a further consumer, then connection of all the connected consumers is assured.

In this case the connection of the protection line to the previously connected consumer 10 is to be cancelled and the last consumer unit in the series must make the connection to the evaluation device 9.

As soon as an interruption of the protection line is discovered, evaluation device 9 switches off the mains for this circuit of consumer units.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A mobile high voltage network for the supply of at least one electrical consumer or electrical load connected via a plug-in connection which can be switched off and on by a mechanical switch, the network comprising a fuse which is activated in the event of a short circuit, wherein the high voltage network carries a D.C. voltage, and wherein a separately activated diagnostic and protection monitoring system is assigned to each electrical consumer or load when a consumer or load is switched on and/or off, and wherein during diagnostic checking of the mechanical switch between a positive line and a negative line of the network, a high-impedance current path acting as current divider includes at least three resistors connected in series, whereby the resistors by-pass the switch.

2. The high voltage network according to claim 1, wherein the diagnostic and protection monitoring system includes means to prevent arcs when actuating the mechanical switch and/or disconnecting the connector; for the monitoring of defective conditions, said defective conditions including overloading of the network; and for switching off the network in the event of the occurrence of defective conditions.

3. The high voltage network according to claim 1, wherein an electronic power switch is switched in parallel to the mechanical switch, whereby to switch on the consumer, the power switch is first switched on until at least achieving an approximate potential equalization and, after achieving at least the approximate potential equalization, the mechanical switch is switched on, and wherein to switch off the consumer before the switching off of the mechanical switch, the power switch is switched on and remains switched on until the mechanical switch is switched off.

4. The high voltage network according to claim 1, wherein with the consumer switched on, the connector is secured against release by a mechanical lock.

5. The high voltage network according to claim 1, wherein current carrying lines of the consumer are provided with a protection line carrying a reference potential, and wherein in the event of a change in the reference potential occurring through one of a breakage of a line carrying current and interruption of the protection line, the high voltage network is switched off by means of a diagnostic evaluation device.

6. The high voltage network according to claim 5, wherein the reference potential is set to average potential between a positive pin and a negative pin.

7. The high voltage network according to claim 6, wherein the reference potential is set to average potential by means of two resistors.

8. The high voltage network according to claim 2, wherein said defective conditions include at least one of overloading the network and interruption of power supply to a consumer.

9. A high voltage network according to claim 5, further comprising a power switch located between the positive line and the negative line and switched by the response of the diagnostic evaluation device to generate a short-circuit, the network further comprising two fuses, one located in the positive line and one located in the negative line in the direction of flow of the current before the power switch, the or each fuse responding to the short-circuit by interrupting the high voltage network.

10. A high voltage network according to claim 1, wherein a power switch is located between the positive line and the negative line, and wherein during the uncompleted process of switching off the consumer initiated by the diagnostic evaluation device when the at least one mechanical switch fitted between the power switch and the consumer is set to open and the power switch switched to short circuit, an ammeter determines the current flowing through the switch, the diagnostic evaluation device only continuing the process of switching off the consumer if the measured current falls below a preset value.

11. A mobile high voltage network for the supply of at least one electrical consumer or electrical load connected via a plug-in connection which can be switched off and on by a mechanical switch, the network comprising a fuse which is activated in the event of a short circuit, wherein the high voltage network carries a D.C. voltage, and wherein a separately activated diagnostic and protection monitoring system is assigned to each electrical consumer or load when a consumer or load is switched on and/or off, and wherein with the consumer switched on, the connector is secured against release by a mechanical lock, and wherein during diagnostic checking of the mechanical switch between a positive line and a negative line of the network, a high-impedance current path acting as current divider includes at least three resistors connected in series, whereby the resistors by-pass the switch.

12. The high voltage network according to claim 11, wherein the diagnostic and protection monitoring system includes means to prevent arcs when actuating the mechanical switch and/or disconnecting the connector; for the monitoring of defective conditions, said defective conditions including overloading of the network; and for switching off the network in the event of the occurrence of defective conditions.

13. The high voltage network according to claim 11, wherein an electronic power switch is switched in parallel to the mechanical switch, whereby to switch on the consumer, the power switch is first switched on until at least achieving an approximate potential equalization and, after achieving at least the approximate potential equalization, the mechanical switch is switched on, and wherein to switch off the consumer before the switching off of the mechanical switch, the power switch is switched on and remains switched on until the mechanical switch is switched off.

14. The high voltage network according to claim 11, wherein current carrying lines of the consumer are provided with a protection line carrying a reference potential, and wherein in the event of a change in the reference potential occurring through one of a breakage of a line carrying current and interruption of the protection line, the high voltage network is switched off by means of a diagnostic evaluation device.

15. The high voltage network according to claim 14, wherein the reference potential is set to average potential between a positive pin and a negative pin.

16. The high voltage network according to claim 15, wherein the reference potential is set to average potential by means of two resistors.

17. The high voltage network according to claim 12, wherein said defective conditions include at least one of overloading the network and interruption of power supply to a consumer.

18. A high voltage network according to claim 11, further comprising a power switch located between a positive line and a negative line and switched by the response of the diagnostic evaluation device to generate a short-circuit, the network further comprising two fuses, one located in the positive line and one located in the negative line in the direction of flow of the current before the power switch, the or each fuse responding to the short-circuit by interrupting the high voltage network.

19. A high voltage network according to claim 11, wherein a power switch is located between a positive line and a negative line, and wherein during the uncompleted process of switching off the consumer initiated by the diagnostic evaluation device when the at least one mechanical switch fitted between the power switch and the consumer is set to open and the power switch switched to short circuit, an ammeter determines the current flowing through the switch, the diagnostic evaluation device only continuing the process of switching off the consumer if the measured current falls below a preset value.

20. A mobile high voltage network for the supply of at least one electrical consumer or electrical load connected via a plug-in connection which can be switched off and on by a mechanical switch, the network comprising a fuse which is activated in the event of a short circuit, wherein the high voltage network carries a D.C. voltage, and wherein a separately activated diagnostic and protection monitoring system is assigned to each electrical consumer or load when a consumer or load is switched on and/or off, wherein current carrying lines of the consumer are provided with a protection line carrying a reference potential, and wherein in the event of a change in the reference potential occurring through one of a breakage of the line carrying current and interruption of the protection line, the high voltage network is switched off by means of a diagnostic evaluation device, and wherein a power switch located between a positive line and a negative line and switched by the response of the diagnostic evaluation device to generate a short-circuit, the network further comprising two fuses, one located in the positive line and one located in the negative line in the direction of flow of the current before the power switch, the or each fuse responding to the short-circuit by interrupting the high voltage network.

21. The high voltage network according to claim 20, wherein the diagnostic and protection monitoring system includes means to prevent arcs when actuating the mechanical switch and/or disconnecting the connector; for the monitoring of defective conditions, said defective conditions including overloading of the network; and for switching off the network in the event of the occurrence of defective conditions.

22. The high voltage network according to claim 20, wherein an electronic power switch is switched in parallel to the mechanical switch, whereby to switch on the consumer, the power switch is first switched on until at least achieving an approximate potential equalization and, after achieving at least the approximate potential equalization, the mechanical switch is switched on, and wherein to switch off the consumer before the switching off of the mechanical switch, the power switch is switched on and remains switched on until the mechanical switch is switched off.

23. The high voltage network according to claim 20, wherein during diagnostic checking of the power switch between the positive line and the negative line of the network, a high-impedance current path acting as current divider includes at least three resistors connected in series, whereby the resistors by-pass the switch.

24. The high voltage network according to claim 20, wherein with the consumer switched on, the connector is secured against release by a mechanical lock.

25. The high voltage network according to claim 20, wherein the reference potential is set to average potential between a positive pin and a negative pin.

26. The high voltage network according to claim 25, wherein the reference potential is set to average potential by means of two resistors.

27. The high voltage network according to claim 20, wherein said defective conditions include at least one of overloading the network and interruption of power supply to a consumer.

28. A high voltage network according to claim 20, wherein a power switch is located between the positive line and the negative line, and wherein during the uncompleted process of switching off the consumer initiated by the diagnostic evaluation device when the at least one mechanical switch fitted between the power switch and the consumer is set to open and the power switch switched to short circuit, an ammeter determines the current flowing through the switch, the diagnostic evaluation device only continuing the process of switching off the consumer if the measured current falls below a preset value.

29. A mobile high voltage network for the supply of one or more electrical consumers or electrical loads, each consumer or load being connected via a respective plug-in connection which can be switched off and on by a respective mechanical switch, the network including a fuse for each connection which is activated in the event of a short circuit, wherein the high voltage network has a positive pin and negative pin from which a D.C. voltage can be sourced and wherein a separately activated diagnostic and protection monitoring system is assigned to each electrical consumer or load, the or each monitoring system being arranged to check the network for faults when a consumer or load is plugged-in and only to connect the consumer or load if no faults are detected in the network, switch off the network if any fault subsequently occurs, and including means to prevent arcs when actuating the or each mechanical switch and/or disconnecting the or each plug-in connection, wherein each plug-in connection is supplied with power via a positive line and a negative line which both include a respective mechanical switch, a high impedance current path is provided between the positive and negative lines which includes at least three resistors in series, one of these resistors is connected in parallel to the positive line mechanical switch and during diagnostic checking of the positive line switch bypasses this switch, similarly another of these resistors is connected in parallel to the negative line mechanical switch and during diagnostic checking of the negative line switch bypasses this switch.

30. A high voltage network in accordance with claim 29, wherein an electronic power switch is connected in parallel to the or each of the mechanical switches, whereby to switch on a particular consumer, the appropriate power switch is first switched on until at least achieving an approximate potential equalization and, after achieving at least the approximate potential equalization, the parallel mechanical switch is switched on, and wherein to switch off a particular consumer before the switching off of the appropriate mechanical switch, the parallel power switch is switched on and remains switched on until the mechanical switch is switched off.

31. A high voltage network in accordance with claim 29, wherein with the consumer switched on, the respective connector is secured against release by a mechanical lock.

32. A high voltage network in accordance with claim 29, wherein current carrying lines of the consumer are provided with a protection line carrying a reference potential, and wherein in the event of a rise or fall of the reference potential occurring through a breakage of a line carrying current and/or in the event of the interruption of the protection line the network or mains voltage is switched off by means of a diagnostic evaluation device which forms part of the relevant diagnostic and protection monitoring system.

33. A high voltage network in accordance with claim 32, wherein the reference potential is set to the average potential between the positive pin and the negative pin.

34. A high voltage network in accordance with claim 33, wherein the reference potential is set to the average potential by means of two resistors.

35. A high voltage network in accordance with claim 32, wherein each plug-in connection is supplied with power via a positive line and a negative line which each include a fuse, a power switch is located between the positive and negative lines and is actuated by the diagnostic evaluation device to produce a short-circuit when a fault occurs, the or each fuse responding to the short-circuit by interrupting the high voltage network.

36. A high voltage network in accordance with claim 29, wherein each plug-in connection is supplied with power via a positive line and a negative line, a power switch is located between the positive and negative lines, this power switch is triggered by a diagnostic device, which forms part of the diagnostic protection and monitoring system, during a switch-off of a consumer which is not yet completed to produce a short-circuit whereby at least one mechanical switch arranged between the power switch and the consumer is set to open, and an ammeter is provided to detect the short-circuit current flowing during the switch off operation, whereby the diagnostic device only continues to switch off the consumer if the short-circuit current flowing falls below a pre-set value.

37. A mobile high voltage network for the supply of two or more electrical consumers or electrical loads connected via respective current carrying lines and plug-in connections which can each be switched off and on by a respective mechanical switch, the network comprising a fuse which is activated in the event of a short circuit, wherein the high voltage network carries a D.C. voltage, and wherein a separately activated diagnostic and protection monitoring system is assigned to each electrical consumer or load when a consumer or load is switched on and/or off, and wherein with the consumer switched on, the connector is secured against release by a mechanical lock, each current carrying line being provided with a protection line carrying a reference potential, and wherein in the event of a change in the reference potential occurring through one of a breakage of a line carrying current and interruption of the protection line, the high voltage network is switched off by means of a diagnostic evaluation device.

38. A mobile high voltage network for the supply of two or more electrical consumers or electrical loads connected via respective current carrying lines and plug-in connections which can each be switched off and on by a respective mechanical switch, the network comprising a fuse which is activated in the event of a short circuit, wherein the high voltage network carries a D.C. voltage, and wherein a separately activated diagnostic and protection monitoring system is assigned to each electrical consumer or load when a consumer or load is switched on and/or off, and wherein with the consumer switched on, the connector is secured against release by a mechanical lock, and further comprising a power switch located between a positive line and a negative line and switched by the response of the diagnostic evaluation device to generate a short-circuit, the network further comprising two fuses, one located in the positive line and one located in the negative line in the direction of flow of the current before the power switch, the or each fuse responding to the short-circuit by interrupting the high voltage network.

39. A mobile high voltage network for the supply of two or more electrical consumers or electrical loads, each consumer or load being connected via a respective plug-in connection which can be switched off and on by a respective mechanical switch, the network including a fuse for each connection which is activated in the event of a short circuit, wherein the high voltage network has a positive pin and negative pin from which a D.C. voltage can be sourced via current carrying lines and the plug-in connections, and wherein a separately activated diagnostic and protection monitoring system is assigned to each electrical consumer or load, the or each monitoring system being arranged to check the network for faults when a consumer or load is plugged-in and only to connect the consumer or load if no faults are detected in the network, switch off the network if any fault subsequently occurs, and including means to prevent arcs when actuating the or each mechanical switch and/or disconnecting the or each plug-in connection, the current carrying lines of each consumer being provided with a protection line carrying a reference potential, and wherein in the event of a rise or fall of the reference potential occurring through a breakage of a line carrying current and/or in the event of the interruption of the protection line the network or mains voltage is switched off by means of a diagnostic evaluation device which forms part of the relevant diagnostic and protection monitoring system.

40. A mobile high voltage network for the supply of one or more electrical consumers or electrical loads, each consumer or load being connected via a respective plug-in connection which can be switched off and on by a respective mechanical switch, the network including a fuse for each connection which is activated in the event of a short circuit, wherein the high voltage network has a positive pin and negative pin from which a D.C. voltage can be sourced and wherein a separately activated diagnostic and protection monitoring system is assigned to each electrical consumer or load, the or each monitoring system being arranged to check the network for faults when a consumer or load is plugged-in and only to connect the consumer or load if no faults are detected in the network, switch off the network if any fault subsequently occurs, and including means to prevent arcs when actuating the or each mechanical switch and/or disconnecting the or each plug-in connection, wherein each plug-in connection is supplied with power via a positive line and a negative line which each include a fuse, a power switch is located between the positive and negative lines and is actuated by the diagnostic evaluation device to produce a short-circuit when a fault occurs, the or each fuse responding to the short-circuit by interrupting the high voltage network.

* * * * *